US011415419B2

(12) United States Patent
Wang et al.

(10) Patent No.: US 11,415,419 B2
(45) Date of Patent: Aug. 16, 2022

(54) POLARIZER IMPLEMENTED IN A PHOTONIC INTEGRATED CIRCUIT FOR USE IN A FIBER OPTIC GYROSCOPE

(71) Applicant: KVH Industries, Inc., Middletown, RI (US)

(72) Inventors: Liming Wang, Tinley Park, IL (US); Daniel R. Halstead, Middletown, RI (US); Thomas D. Monte, Tinley Park, IL (US); Martin A. Kits van Heyningen, Newport, RI (US)

(73) Assignee: KVH Industries, Inc., Middletown, RI (US)

( * ) Notice: Subject to any disclaimer, the term of this patent is extended or adjusted under 35 U.S.C. 154(b) by 114 days.

(21) Appl. No.: 16/599,379

(22) Filed: Oct. 11, 2019

(65) Prior Publication Data

US 2020/0116489 A1 Apr. 16, 2020

Related U.S. Application Data

(60) Provisional application No. 62/744,505, filed on Oct. 11, 2018.

(51) Int. Cl.
*G01C 19/72* (2006.01)
*G02B 6/293* (2006.01)
*G02B 6/42* (2006.01)

(52) U.S. Cl.
CPC ....... *G01C 19/721* (2013.01); *G02B 6/29302* (2013.01); *G02B 6/42* (2013.01); *G02B 6/4213* (2013.01)

(58) Field of Classification Search
CPC .... G01C 19/721; G02B 6/29302; G02B 6/42; G02B 6/4213
See application file for complete search history.

(56) References Cited

U.S. PATENT DOCUMENTS 4,420,259 A 12/1983 Taylor
4,678,267 A 7/1987 Burns
(Continued)

FOREIGN PATENT DOCUMENTS

CN 107843957 A 3/2018
EP 279603 A2 8/1988
(Continued)

OTHER PUBLICATIONS

International Search Report and Written Opinion for PCT/US2019/055849 dated Mar. 11, 2020, titled "Photonic Integrated Circuits, Fiber Optic Gyroscopes and Methods for Making the Same".
(Continued)

*Primary Examiner* — Hwa Andrew Lee
(74) *Attorney, Agent, or Firm* — Hamilton, Brook, Smith & Reynolds, P.C.

(57) ABSTRACT

A multifunctional photonic integrated circuit (PIC) suitable for the manufacture of fiber optic gyroscopes (FOG) is described. The PIC is constructed and arranged to exhibit a scale factor of substantially high stability and accuracy. The PIC may comprise, for example, a high optical birefringence and low propagation loss waveguide, a low wavelength-dependent split-ratio Y-junction, a high extinction ratio linear polarizer, and high efficiency fiber-to-waveguide mode-size converters. Considerations for ensuring high-level FOG performance are addressed by, for example, optimization of waveguide structure, functional requirements for individual components, and combined effects of the circuit layout. A high-end, tactical grade FOG may be built using the disclosed PIC, after connecting to polarization maintaining optical fiber coil, a light source, and a photodetector.

10 Claims, 12 Drawing Sheets
(10 of 12 Drawing Sheet(s) Filed in Color)

(56) References Cited

U.S. PATENT DOCUMENTS

| | | | |
|---|---|---|---|
| 4,842,358 A | 6/1989 | Hall | |
| 4,890,922 A | 1/1990 | Wilson | |
| 4,938,594 A | 7/1990 | Pavlath | |
| 4,969,742 A | 11/1990 | Falk | |
| 5,037,205 A * | 8/1991 | Pavlath | G01C 19/722 356/464 |
| 5,194,917 A | 3/1993 | Regener | |
| 5,223,911 A | 6/1993 | Suchoski | |
| 5,321,503 A | 6/1994 | Bramson | |
| 5,365,338 A | 11/1994 | Bramson | |
| 5,393,371 A | 2/1995 | Chang et al. | |
| 5,436,992 A | 7/1995 | Wang | |
| 5,537,671 A | 7/1996 | Toyama et al. | |
| 5,579,424 A | 11/1996 | Schneider | |
| 5,600,745 A | 2/1997 | Wuu | |
| 5,627,644 A | 5/1997 | Sanders | |
| 5,729,641 A | 3/1998 | Chandonnet | |
| 5,838,844 A | 11/1998 | Van Dam | |
| 5,946,434 A | 11/1999 | Lee | |
| 5,982,961 A | 11/1999 | Pan | |
| 6,108,086 A | 8/2000 | Michal | |
| 6,140,009 A | 10/2000 | Wolk | |
| 6,163,632 A | 12/2000 | Rickman | |
| 6,293,688 B1 | 9/2001 | Deacon | |
| 6,360,038 B1 | 3/2002 | Grubsky | |
| 6,445,455 B1 | 9/2002 | Hall | |
| 6,680,472 B1 | 1/2004 | Thingboet | |
| 6,760,520 B1 | 7/2004 | Medin | |
| 6,905,904 B2 | 6/2005 | Gardner | |
| 6,920,257 B1 | 7/2005 | Mekis | |
| 7,061,610 B2 | 6/2006 | Mittelstein | |
| 7,085,441 B1 | 8/2006 | Kozlov | |
| 7,218,809 B2 | 5/2007 | Zhou | |
| 7,224,878 B1 | 5/2007 | Wessels | |
| 7,899,286 B2 | 3/2011 | Yoshida | |
| 8,121,874 B1 | 2/2012 | Guheen | |
| 9,411,098 B2 | 8/2016 | Onaka | |
| 9,690,045 B2 | 6/2017 | Goodwill et al. | |
| 9,739,938 B2 | 8/2017 | Shi | |
| 9,746,612 B2 | 8/2017 | Lipson | |
| 10,108,789 B2 | 10/2018 | Lehmann et al. | |
| 10,274,319 B2 | 4/2019 | Wang | |
| 10,488,596 B2 | 11/2019 | Akiyama | |
| 10,545,288 B2 | 1/2020 | Ma | |
| 10,921,682 B1 | 2/2021 | Wang | |
| 11,092,748 B2 | 8/2021 | Wang | |
| 11,320,267 B2 | 5/2022 | Wang | |
| 11,353,655 B2 | 6/2022 | Wang | |
| 2002/0003918 A1 | 1/2002 | Ooi | |
| 2002/0197037 A1 | 1/2002 | Bailey | |
| 2002/0024786 A1 | 2/2002 | Sanders | |
| 2002/0149780 A1 | 10/2002 | Trinh | |
| 2003/0081902 A1 | 5/2003 | Blauvelt | |
| 2004/0057667 A1 | 3/2004 | Yamada | |
| 2004/0168234 P1 | 8/2004 | Fischer | |
| 2004/0223695 A1 | 11/2004 | Kersten | |
| 2005/0021348 A1 | 1/2005 | Chan | |
| 2005/0025427 A1 | 2/2005 | Dougherty | |
| 2006/0251849 A1 | 11/2006 | Blauvelt | |
| 2007/0053625 A1 | 3/2007 | Ichioka | |
| 2007/0229838 A1 | 10/2007 | Greening | |
| 2008/0291459 A1 | 11/2008 | Meyer | |
| 2009/0087144 A1 | 4/2009 | Yoshida | |
| 2009/0190876 A1 | 7/2009 | Doi | |
| 2010/0137849 A1 | 6/2010 | Bhandari | |
| 2012/0217419 A1 | 8/2012 | Riesen et al. | |
| 2013/0202250 A1 | 8/2013 | Guattari et al. | |
| 2013/0308897 A1 | 11/2013 | Sercel | |
| 2014/0075357 A1 | 3/2014 | Flores | |
| 2014/0185979 A1 | 7/2014 | Evans | |
| 2014/0376001 A1 | 12/2014 | Swanson | |
| 2014/0376083 A1 | 12/2014 | Onaka | |
| 2015/0021291 A1 | 1/2015 | Shastri | |
| 2015/0212271 A1 | 7/2015 | Chen | |
| 2015/0027042 A1 | 10/2015 | Goodwill | |
| 2015/0277156 A1 | 10/2015 | Kondou | |
| 2017/0131472 A1 | 5/2017 | Kobyakov | |
| 2017/0168234 A1 | 6/2017 | Shi | |
| 2017/0192171 A1 | 7/2017 | Shi | |
| 2017/0205578 A1 | 7/2017 | Van Thourhout | |
| 2017/0205583 A1 | 7/2017 | Bennett | |
| 2017/0329082 A1 | 11/2017 | Ma | |
| 2018/0120504 A1 | 5/2018 | Qi | |
| 2018/0259337 A1 * | 9/2018 | Wang | G01C 19/725 |
| 2019/0086614 A1 | 3/2019 | Wang | |
| 2020/0371286 A1 | 11/2020 | Wang | |
| 2021/0048721 A1 | 2/2021 | Wang | |
| 2021/0240050 A1 | 8/2021 | Khan | |

FOREIGN PATENT DOCUMENTS

| | | |
|---|---|---|
| EP | 0893671 | 1/1990 |
| EP | 0379520 A1 | 8/1990 |
| EP | 0883000 A1 | 12/1998 |
| EP | 1025422 A1 | 8/2000 |
| EP | 1396741 A1 | 3/2004 |
| EP | 2096408 A2 | 4/2008 |
| EP | 2246663 A2 | 11/2010 |
| EP | 3454101 A1 | 3/2019 |
| GB | 2201256 A | 8/1988 |
| JP | H08226822 A | 9/1996 |
| JP | H09159869 A | 6/1997 |
| JP | 20070272121 A | 10/2007 |
| JP | 20120215901 A | 11/2012 |
| JP | 2013255086 A | 12/2013 |
| WO | 8910534 A1 | 11/1989 |
| WO | 198901534 A1 | 11/1989 |
| WO | 2015108488 A1 | 7/2015 |
| WO | 2016010528 A1 | 1/2016 |
| WO | 2018175524 A1 | 9/2018 |
| WO | 20180165238 A1 | 9/2018 |
| WO | 2019055663 A1 | 3/2019 |
| WO | 2020077216 A1 | 4/2020 |
| WO | 2020092789 A1 | 5/2020 |
| WO | 2021154970 A1 | 8/2021 |

OTHER PUBLICATIONS

Bauters, et al., "Ultralow-Loss Planar Si3N4 Waveguide Polarizers," IEEE Photonics Journal, 5(1), Article S/N: 6600207 (2013).

Cheng, Z.J., et al., "Polymer-waveguide-based vertical coupler", Optics Communications, vol. 260, No. 2, Apr. 15, 2006.

Florjanczyk, M., et al, "Tiny spectrometer enables cost-effective space-borne sensing" SPIE Newsroom, 10.1117/2.1200912.002524, 2009.

Garanovich, I., et al., "Nonlinear directional coupler for polychromatic light", Optics Letters vol. 32, Issue 5, pp. 475-477 (2007).

Hammer, M., et al., "Hybrid coupled-mode modeling in 3D: perturbed and coupled channels, and waveguide crossings", Journal of Optical Society of America, vol. 34, No. 3, Mar. 1, 2017.

Hatta, A.M., et al., "A simple integrated ratiometric wavelength monitor based on a directional coupler", Optik 125 (2014) 795-798.

Hatta, A.M., et al. "Design of the optical core of an integrated ratiometric wavelength monitor" Proceedings 14th European Conference on Integrated Optics: ECIO 08 Eindhoven: Jun. 11-13, 2008, Eindhoven University of Technology, The Netherlands, paper, ThP25.

Humaira, Z., et al: "Integrated silicon photonic TE-pass polarizer", 2016 Photonics North (PN), IEEE, May 24, 2016 (May 24, 2016).

Lallier, E., et al., "Laser Oscillation of Single-Mode Channel Waveguide in ND:MGO:LINB03", Electronic Letters, IEEE Stevenage, GB, vol. 26, No. 22, Oct. 26, 1989.

Leijtens, X., et al., "Arrayed Waveguide Gratings", in "Wavelength Filters in Fibre Optics", vol. 123 of the series Springer Series in Optical Sciences pp. 125-187 (date uknown).

Muneeb, M., et al., "Silicon-on-insulator shortwave infrared wavelength meter with integrated photodiodes for on-chip laser monitoring", Nov. 3, 2014 | vol. 22, No. 22 | DOI:10.1364/OE.22.027300 | Optics Express 27300.

(56) References Cited

OTHER PUBLICATIONS

Seyringer, D., et al., "Arrayed Waveguide Gratings", SPIE Press Book, Date Published: Jun. 3, 2016, ISBN: 9781510603608, vol. SL16.

Shang. K., et al., "Low-loss compact multilayer silicon nitride platform for 3D photonic integrated circuits" Optics Express, vol. 23, No. 16, Aug. 6, 2015.

Srinivasan, S., et al., "Design of integrated hybrid silicon waveguide optical gyroscope", Optics Express 24988, vol. 22, No. 21, Oct. 20, 2014.

Tan, Y. et al., "Polarization-selective microring resonators", Optics Express, vol. 25, No. 4, Feb. 15, 2017 (Feb. 15, 2017).

Tran, M., et al., "Integrated optical driver for interferometric optical gyroscopes", Optics Express 3827,vol. 25, No. 4. Feb. 20, 2017.

Wang, P., et al., "Passive photonic integrated ratiometric wavelength monitor with resolution better than 15 pm", vol. 25, No. 3 | Feb. 6, 2017 | Optics Express 2940.

Wang, P., et al. "Wavelength Measurement Based on a Silicon-on-Insulator Directional Coupler Integrated Device", Sensors 2015, 15 21281.

Yu, C., et al., "Stable and Compact Optical Module for Fiber-Optic Gyroscope Application", Fiber and Integrated Optics, 33:306-314, 2014.

International Search Report and Written Opinion for PCT/US2018/021262 dated Jun. 15, 2018 entitled "Photonic Integrated Circuit for an Interference Fiber Optic Gyroscope (IFOG)".

International Search Report and Written Opinion for PCT/US2018/023472 dated Jun. 29, 2018 entitled "Integrated Optic Wavemeter and Method for Fiber Optic Gyroscopes Scale Factor Stabilization".

International Search Report and Written Opinion for PCT/US2018/050896 dated Jan. 7, 2019 entitled "Method and Apparatus for Self-Alignment Connection of Optical Fiber to Waveguide of Photonic Integrated Circuit".

International Search Report and Written Opinion for PCT/US2019/059195 dated Jan. 16, 2020 entitled "Method and Apparatus for Control and Suppression of Stray Light in a Photonic Integrated Circuit".

International Search Report and Written Opinion for PCT/US2020/033092 dated Sep. 4, 2020 titled "Integrated Optical Polarizer and Method of Making Same".

International Search Report and Written Opinion for PCT/US2020/045877 dated Nov. 9, 2020 titled "Integrated Optical Phase Modulator and Method of Making Same".

Lu, M.. et al., "Field Patterns of the TE Modes in Ridge-Trough Waveguide", International Journal of Infrared and Millimeter Waves, Kluwer Academic Publishers-Plenum Publishers, NE, vol. 23, No. 8, Aug. 1, 2002.

Pu, M et al., "Ultra-low-loss inverted taper coupler for silicon-on-insulator ridge waveguide", Optics Communications, Elsevier, Amsterdam, NL, vol. 283, No. 19, Oct. 1, 2010.

Park, H., et al. "Device and Integratino Technology for Silicon Photonic Transmitters", IEEE Journal of Selectred Topics in Quantum Electronics, vol. 17, No. 3, May/Jun. 2011.

International Preliminary Report on Patentability for PCT/US2019/055849 dated Apr. 8, 2021, titled "Photonic Integrated Circuits, Fiberoptic Gyroscopes and Methods for Making the Same".

International Preliminary Report on Patentabiilty for PCT/US2019/059195 dated May 14, 2021 titled "Method and Apparatus for Control and Suppression of Stray Light in a Photonic Integrated Circuit".

Hochber, M., et al., "Silicon photonics: the next fabless semiconductor industry", IEEE Solid-State Circuits Magazine, IEEE, USA, vol. 5, No. 1, Mar. 1, 2013.

Ren, T., et al., "An Integrated Low-Voltage Broadband Lithium Niobate Phase Modulator", IEEE Photonics Technology Letters, vol. 31, No. 11, Jun. 1, 2019.

Sanders, G., et al., "Improvements to Signal Processing and Component Minaturization of Compact Resonator Fiber Optic Gyroscopes", 2018 DGON Inertial Sensors and Systems (ISS), IEEE, Sep. 11, 2018.

Steier, W.H., et al., "Polymer Electro-Optic Devices for Integrated Optics", Chemical Physics, Amsterdam, NL, vol. 245, No. 1-03, Jul. 1, 1999.

International Search Report and Written Opinion for PCT/US2021/015454 dated Jun. 21, 2021 titled"Integrated Modulator Structure for In-situ Power Balancing in Photonic Fiber Optic Gyroscopes".

International Preliminary Report on Patentability for PCT/US2020/045877 dated Mar. 3, 2022 titled "Integrated Optical Phase Modulator and Method of Making Same".

International Preliminary Report on Patentability for PCT/US2020/033092 dated Dec. 2, 2021 titled Integrated Optical Polarizer and Method of Making Same.

\* cited by examiner

POLARIZER IMPLEMENTED IN A PHOTONIC INTEGRATED CIRCUIT FOR USE IN A FIBER OPTIC GYROSCOPE

RELATED APPLICATION

This application claims the benefit of U.S. Provisional Application No. 62/744,505, filed on Oct. 11, 2018. The entire teachings of the above application are incorporated herein by reference.

BACKGROUND

Fiber Optic Gyroscopes (FOGs), accelerometers, and FOG-based inertial navigation systems (INSs) form key parts of integrated sensor systems essential for highly accurate autonomous vehicle, such as a car, performance. An INS is used to sense the location and the orientation of the vehicle. For vehicle localization estimation, the vehicles may use a combination of the Global Positioning System (GPS) and INS. The accuracy of GPS systems has improved significantly since the year 2000. The GPS system specifies a signal that facilitates a global average user range error (URE) of less than 7.8 m, with 95% probability. Though actual performance will likely exceed the specification, GPS by itself cannot supply enough accuracy for a position estimation for an autonomous vehicle. GPS, however, provides good long-term stability on position measurement. By contrast, INS can be highly accurate in the short-term, but INS suffers from long-term drift on the position measurement.

Combining GPS and an INS may be used to overcome the disadvantages of each individual position sensing system. This combined operation becomes even more important in the autonomous car application, since the accuracy of GPS may be degraded near buildings, bridges, and trees. In such environments, a GPS receiver may be unable to obtaining signals from a sufficient number of satellites, resulting in degraded performance. There is a significant concern in urban areas, where skyscrapers create "urban canyons" in which GPS availability may be severely limited. INS may be used to improve the accuracy of GPS and to fill in performance gaps such as those caused by urban canyons. INS that is coupled with GPS can dead-reckon the current position and calculate orientation and velocity continuously without need for external references.

For car pose estimation, INS sensors may be fused with GPS signal to detect roll, pitch and heading of a moving car instantaneously. Determination of the exact turning angle is an important task for the autonomous vehicle control system to ensure safety, which demands a highly accurate and stable scale factor of the gyroscope associated with the autonomous vehicle.

SUMMARY

Some embodiments described herein are directed to an interference fiber optic gyroscope (IFOG). An example embodiment of an IFOG may be configured to exhibit a scale factor having a stability that exceeds a predetermined stability threshold, and an accuracy that exceeds a predetermined accuracy threshold, as described herein.

Other embodiments described herein are directed to IFOG components, such as a photonic integrated circuit (PIC) that is based on a highly polarization maintaining (PM) waveguide with a $Si_3N_4$ core and cladding material comprising $SiO_2$. Passive functional FOG components may be integrated onto the PIC. Such components may comprise low-loss couplers used for a Sagnac interferometer and for a source/detector transceiver, a high polarization extinction ratio (PER) polarizer, highly efficient fiber-connection mode size converters, and one or more features for elimination of stray light.

In one aspect, the invention may be a photonic integrated circuit (PIC) comprising a polarizer and an interferometric Y-junction. The polarizer may comprise a polarizer waveguide and have a first polarizer port and a second polarizer port. The polarizer may be configured to have, within a range of operational wavelengths of the PIC, a propagation extinction ratio (PER) of at least 75 dB and a birefringence of at least 0.012. The interferometric Y-junction may have a base waveguide, a first branch waveguide, and a second branch waveguide, that are polarization maintaining (PM), have a predetermined length difference with respect to one another, and are configured to support a single transverse mode of light.

In an embodiment, an H-parameter of each of the polarizer waveguide, the base waveguide, the first branch waveguide, and the second branch waveguide, is less than −40 dB/m.

In another embodiment, a waveguide length difference between the first branch waveguide and the second branch waveguide may be greater than a depolarization length of the first branch waveguide and the second branch waveguide. The polarizer waveguide, the first branch waveguide, and the second branch waveguide may each comprise a $Si_3N_4$ core surrounded by $SiO_2$ cladding material. The core may have a width-to-height aspect ratio of at least 50. The waveguide may comprise a plurality of waveguide bends that are optically connected in series. The plurality of waveguide bends may comprise a first 180-degree bend, a second 180-degree bend, and at least one additional bend of at least 90 degrees.

An embodiment may further comprise at least one trench formed along a side of the waveguide. The trench may be configured to deflect light radiated from the waveguide, away from the PIC, to prevent stray light from coupling into the PIC.

An embodiment may further comprise a first connector configured to be connected to a light source, a second connector configured to be connected to a photodetector, a third connector configured to be connected to a first port of a fiber coil, a fourth connector configured to be connected to a second port of the fiber coil, and a source Y-junction having a base waveguide, a first branch waveguide, and a second branch waveguide. The first branch waveguide of the source Y-junction may be optically coupled to the first connector. The second branch waveguide of the source Y-junction may be optically coupled to the second connector. The base waveguide of the source Y-junction may be optically coupled to the first polarizer port. The first branch waveguide of the interferometric Y-junction may be optically coupled to the third connector. The second branch waveguide of the interferometric Y-junction may be optically coupled to the fourth connector. The base waveguide of the source Y-junction may be optically coupled to the second polarizer port.

The base waveguides and the branch waveguides have a birefringence of at least 0.012. The base waveguides and the branch waveguides may have a propagation loss of less than 0.5 dB/cm. The base waveguides and the branch waveguides may comprise a thin $Si_3N_4$ waveguide with a core thickness that is greater than or equal to 10 nm and less than or equal to 100 nm, and with a core width that is greater than or equal to 1 micron and less than or equal to 10 microns. The polarizer waveguide may comprise three 180-degree curves, consecutively coupled to one another to form an m shape.

In another aspect, the invention may be a photonic integrated circuit (PIC) comprising a first connector configured to be optically coupled to a light source, a second connector configured to be optically coupled to a photodetector, a third connector configured to be optically coupled to a first port of a fiber coil, a fourth connector configured to be optically coupled to a second port of the fiber coil, a first coupler having a first branch port, a second branch port and a common base port, a second coupler having a first branch port, a second branch port and a common base port, and a polarizer having a first polarizer port and a second polarizer port, and comprising a polarizer waveguide. The first branch port of the first coupler may be optically coupled to the first connector through a first waveguide, the second branch port of the first coupler may be optically coupled to the second connector through a second waveguide, and the common base port of the first coupler may be optically coupled to the first polarizer port through a third waveguide. The first branch port of the second coupler may be optically coupled to the third connector through a fourth waveguide, the second branch port of the second coupler may be optically coupled to the fourth connector through a fifth waveguide, and the common base port of the second coupler may be optically coupled to the second polarizer port through a sixth waveguide. The polarizer waveguide, the first waveguide, the second waveguide, the third waveguide, the fourth waveguide, the fifth waveguide, and the sixth waveguide may each have a birefringence of at least 0.012, may each have a propagation loss of less than 0.5 dB/cm, and may each be configured to support a single transverse mode of light.

The sixth waveguide may be longer than a depolarization length associated with the sixth waveguide. A difference between a length of the fourth waveguide and a length of the fifth waveguide may be longer than a depolarization length associated with the fourth and fifth waveguides. The polarizer waveguide, the first waveguide, the second waveguide, the third waveguide, the fourth waveguide, the fifth waveguide, and the sixth waveguide may each have a width-to-height aspect ratio of at least 50.

The polarizer waveguide, the first waveguide, the second waveguide, the third waveguide, the fourth waveguide, the fifth waveguide, and the sixth waveguide may each comprise a $Si_3N_4$ core surrounded by $SiO_2$ cladding material. The waveguide may comprise a plurality of waveguide bends optically connected in series. The plurality of waveguide bends may comprise a first 180-degree bend, a second 180-degree bend, and at least one additional bend of at least 90 degrees.

The polarizer waveguide may comprise three 180-degree curves, consecutively coupled to one another to form an "m" shape.

In another aspect, the invention may be an interference fiber optic gyroscope (IFOG) may comprise a photonic integrated circuit (PIC), a sensing fiber coil, and a phase modulator. The PIC may comprise a polarizer having a propagation extinction ratio (PER) of at least 75 dB and a birefringence of at least 0.012. The PIC may further comprise a waveguide that is polarization maintaining and configured to support a single transverse mode of light. The sensing fiber coil may have a first end and a second end. The phase modulator may be disposed at the first end of the sensing fiber coil.

In another aspect, the invention may be an interference fiber optic gyroscope (IFOG) that comprises a photonic integrated circuit (PIC), a sensing fiber coil having a first end and a second end, and a phase modulator disposed at the first end of the sensing fiber coil. The PIC may further comprise a first connector configured to be optically coupled to a light source, a second connector configured to be optically coupled to a photodetector, a third connector configured to be optically coupled to a first port of a fiber coil, a fourth connector configured to be optically coupled to a second port of the fiber coil, a first coupler having a first branch port, a second branch port and a common base port, a second coupler having a first branch port, a second branch port and a common base port, and a polarizer having a first polarizer port and a second polarizer port, and comprising a polarizer waveguide. The first branch port of the first coupler may be coupled to the first connector through a first waveguide. The second branch port of the first coupler may be coupled to the second connector through a second waveguide. The common base port of the first coupler may be coupled to the first polarizer port through a third waveguide. The first branch port of the second coupler may be coupled to the third connector through a fourth waveguide. The second branch port of the second coupler may be coupled to the fourth connector through a fifth waveguide. The common base port of the second coupler may be coupled to the second polarizer port through a sixth waveguide. The polarizer waveguide, the first waveguide, the second waveguide, the third waveguide, the fourth waveguide, the fifth waveguide, and the sixth waveguide may each have a birefringence of at least 0.012, may each have a propagation loss of less than 0.5 dB/cm, and may each be configured to support a single transverse mode of light.

The polarizer waveguide, the first waveguide, the second waveguide, the third waveguide, the fourth waveguide, the fifth waveguide, and the sixth waveguide may each comprise a $Si_3N_4$ core surrounded by $SiO_2$ cladding material. The polarizer waveguide, the first waveguide, the second waveguide, the third waveguide, the fourth waveguide, the fifth waveguide, and the sixth waveguide may each have a width-to-height aspect ratio of at least 50.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications and references cited herein are incorporated by reference in their entirety.

Embodiments of the invention may include an interference fiber optic gyroscope (IFOG) configured to exhibit a scale factor having a stability that exceeds a predetermined stability threshold, and an accuracy that exceeds a predetermined accuracy threshold. An example embodiment may include an IFOG component, such as a photonic integrated circuit (PIC) that is based on highly polarization maintaining (PM), single mode waveguide with a $Si_3N_4$ core and cladding material comprising $SiO_2$. Passive functional IFOG components may be integrated onto the PIC, such as low-loss couplers used for a Sagnac interferometer and for a source/detector transceiver, a high propagation extinction ratio (PER) polarizer, highly efficient fiber-connection mode size converters, and one or more features for elimination of stray light.

The use of an ultra-thin (e.g., less than or equal to 100 nm) $Si_3N_4$ waveguide in the PIC provides several benefits. For example, a $Si_3N_4$ waveguide transmits light in the 830 nm wavelength region, and an IFOG has a larger scale factor at such a short operation wavelength, given a specific fiber length and coil size. Further, birefringence as large as 0.02 may be realized in a $Si_3N_4$ waveguide, and a waveguide with high birefringence may provide substantial phase error suppression. A $Si_3N_4$ waveguide configured to have an ultrahigh aspect ratio may exhibit an ultralow propagation loss. The non-crystalline nature of $Si_3N_4$ facilitates the inclusion of a source coupler into the PIC, and facilitates circuit layout to a shape conducive to preventing stray light from recoupling. Furthermore, $Si_3N_4$ is a well-established material in the microelectronics industry, where it has been used as an electrical and thermal insulator in electric circuits. Fabrication lines associated with $Si_3N_4$ processing are quite mature and have a well-known performance history. $Si_3N_4$ also features a set of optical properties that makes it an ideal choice for many applications that require integration of photonic devices on an integrated platform.

Figure 1:
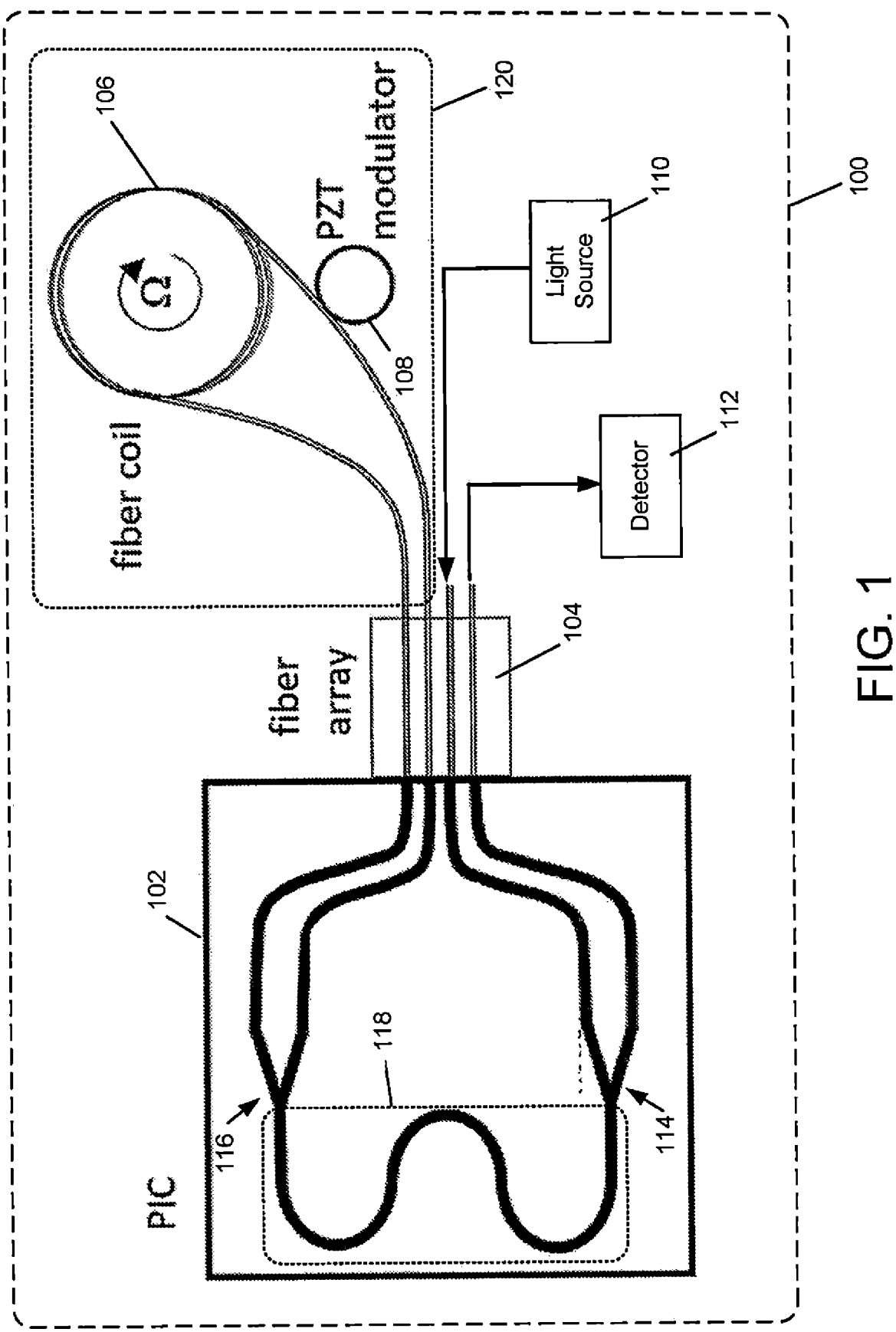
FIG. 1 illustrates an example embodiment of an interference fiber optic gyroscope (IFOG) 100 constructed and arranged according to an embodiment of the invention.

FIG. 1 illustrates an example embodiment of an IFOG 100 constructed and arranged according to the invention. The IFOG 100 comprises a PIC 102, a fiber array 104, a sensing fiber coil 106, a PZT modulator 108, a light source 110 and a light detector 112. The PIC 102 comprises a source Y-junction 114, an interferometric Y-junction 116, and a polarizer 118. Each Y-junction comprises a base waveguide that splits into a pair of branch waveguides. The base and branch waveguides are highly PM and single mode waveguides. Y-junctions may also be referred to herein as couplers. A waveguide has the characteristic of being "highly polarization maintaining" by (i) being highly birefringent, and (ii) having low scattering. Specific value ranges of birefringence and scattering are disclosed herein, which correspond to specific threshold values of PM.

A Sagnac interferometer is formed when the two fiber ends of the sensing fiber coil 106 are connected, through the fiber array 104, to the ends of the two branch waveguides of the interferometric Y-junction 116 in the PIC 102, as shown in FIG. 1. The polarizer 118 connects the base waveguide of the source Y-junction 114 and the base waveguide of the interferometric Y-junction 116. In this example embodiment, the polarizer 118 has an "m" shape, although other shapes may alternatively be used. The polarizer 118 polarizes the input light from the light source 110 that comes through the source Y-junction 114. The polarizer 118 also filters out the cross-coupled erroneous signal in the light returned from the sensing fiber coil 106 by eliminating the TM-mode due to the polarizer's high PER.

A phase modulator 108, implemented by a fiber wound oscillating Lead Zirconate Titanate (PZT) disk, is incorporated into the sensing fiber coil 106 located close to one end of the sensing fiber coil 106, to form a coil/modulation assembly 120. A sinusoidal modulating signal may be applied to the phase modulator 108 in a controlled manner, according to a modulation/demodulation process suitable for stable Sagnac phase shift reading.

The combinations of the polarizer 118, the interferometric Y-junction 116 and the coil/modulation assembly 120 forms a so-called "minimum configuration" of an IFOG optical system. The light along the clock-wise (CW) path and the light along the counter-clockwise (CCW) path undergo the same once reflection and once transmission at the interferometric Y-junction 116, and the Sagnac interferometer is constructed to operate with optical reciprocity, which is necessary for a highly stable IFOG. Light that is input to and output from the Sagnac interferometer passes through the same polarizer 118 and single mode waveguide. Thus, this example embodiment forms a single-mode, single-polarization filter. Any signals that are at different state from the input (e.g., a difference either in spatial mode or polarization mode) are undesired and are substantially eliminated by the single-mode, single-polarization filter.

Mechanisms that produce erroneous non-reciprocal phase shift may perturbate the Sagnac phase shift. The described embodiments serve to mitigate or eliminate such mechanisms in the PIC design. Such erroneous phase shift signals may be caused, for example, by a slight non-reciprocity of the Y-junction in the PIC. The Y-junction effectively operates as a pair of waveguides arranged at an angle with respect to one another, and can be regarded as a two-mode waveguide near the joint point. When the input light from the base waveguide of the Y-junction reaches the coupling region of the Y-junction, the evanescent waves overlap in a two-mode waveguide, and the fundamental symmetric mode is converted into second order antisymmetric mode and the two lobes of the mode field are split and nearly perfectly guided in the two branch waveguides. For the two returning signals coming to the coupling region, a fundamental mode is formed and is guided by the base waveguide, while the second-order antisymmetric mode, which is above the cutoff of the waveguide, is radiated into the substrate. Since there is a residual differential loss between the symmetric and antisymmetric modes, the light transmitted through the junction in different directions is subject to a different loss (depending on the particular direction), so a spurious phase shift at the base port of the Y-junction occurs due to the slight non-reciprocity at the Y-junction. A single-mode, single-polarizer filter, placed at the base waveguide of the interferometric Y-junction, operates to equalize the phase of the light waves transmitted in opposite directions. A benefit of a minimum configuration build with PIC architecture is that the polarizer 118 may be substantially aligned with the interferometric Y-junction 116, with a single mode waveguide filter in between. No additional phase error generation occurs at the junction if a high PER polarizer and a single mode waveguide are implemented after base waveguide of the interferometric Y-junction 116.

An erroneous phase signal may also occur due to light coupled from the operational polarization mode to its orthogonal mode. Since the PM fiber and the PIC waveguide each supports two polarization modes, and the Sagnac interferometer provides two parallel optical paths, any light coupling into the unwanted polarization mode may generate a non-reciprocal parasitic path. Most of the cross-coupling points reside in the fiber coil, but cross-coupling can also occur at the fiber-to-PIC waveguide joints and/or within the path in the PIC (e.g., at the interferometric Y-junction). To stop such non-reciprocal parasitic paths, the polarizer in the single-mode single-polarizer filter is configured to have a substantially high PER.

The high PER filter, however, cannot eliminate the spurious phase error generated by a cross-coupling by two points placed at about the same distance, within the depolarization length of the fiber, from the interferometric Y-junction 116. In the example embodiment of an IFOG PIC, the polarization cross-coupling at the interferometric Y-junction is negligible because the high birefringence of the waveguide provides excellent polarization maintenance. Major polarization couplings happen at the connection points of the coil fibers to the PIC. To avoid the phase error generated at the connection points, one of the branch waveguides of the interferometric Y-junction is configured to be longer than the other branch, to supply a fixed phase shifter between the connection points. The length of the phase shifter is configured to be longer than the depolarization length, which, in the example embodiment, is approximately 1.8 mm.

It is possible that reflections at the two connection points may also produce an erroneous phase signal, because the two reflections at the connection interfaces and the interferometric Y-junction form a Michelson interferometer. Similarly, if the path difference of the two branch waveguides is larger than decoherence length, the erroneous phase can be avoided. The decoherence length of the waveguide of the example embodiment is approximately 28 µm, so the path difference of the two branch waveguides is configured to be at least 28 µm.

Another erroneous phase signal is specific to a multifunction optic integrated circuit (MIOC) fabricated on a LiNbO$_3$ substrate. The LiNbO$_3$ MIOC has been widely used in commercial FOG products. However, increasing its degree of integration by fitting two Y-junctions into a single circuit has not been successful, because the in-plane birefringence of the crystalline LiNbO$_3$ substrate limits the degree of freedom of the optic circuit layout, so that the two Y-junctions must be placed in a straight line. Unguided radiation (occurring along the base waveguides of the Y-junctions due to the asymmetric mode from the interferometric Y-junction) is received by each of the branch waveguide of the source Y-junction. The parasitic signal coming from the spurious recoupling adds to the main signal and results in phase error. To prevent the source Y-junction from receiving the radiated light from the antisymmetrical mode in the FOG PIC, the waveguide that connects the base waveguides configured to form a 180° path loop, as shown in FIG. 1. In fact, the polarizer 118, which connects the source Y-junction 114 to the interferometric Y-junction 116, is configured into an "m" shape that allows the two Y-junctions to be oriented in the same direction.

In the example embodiment, one or more trenches may be etched alongside of the waveguides of the PIC (not shown) to mitigate or eliminate incoming stray light, either by deflecting stray light out of plane, or by absorbing stray light (e.g., by configuring the trenches to be filled with absorbing material), or both.

An ultrathin Si$_3$N$_4$ waveguide may be used to produce a high-PER, low-loss polarizer. Ultra-loosely confined waveguides in various combinations of curves and s-shapes may result in high propagation loss in TM mode, while keep TE-mode loss low. An example embodiment of a planer polarizer comprising a half period of s-bend waveguide of 3.5 µm core width and of 40 nm core height exhibits a PER of 75 dB measured at 1600 nm. This example waveguide has 0.011~0.014 birefringence at 1550 nm wavelength.

Figure 2A:
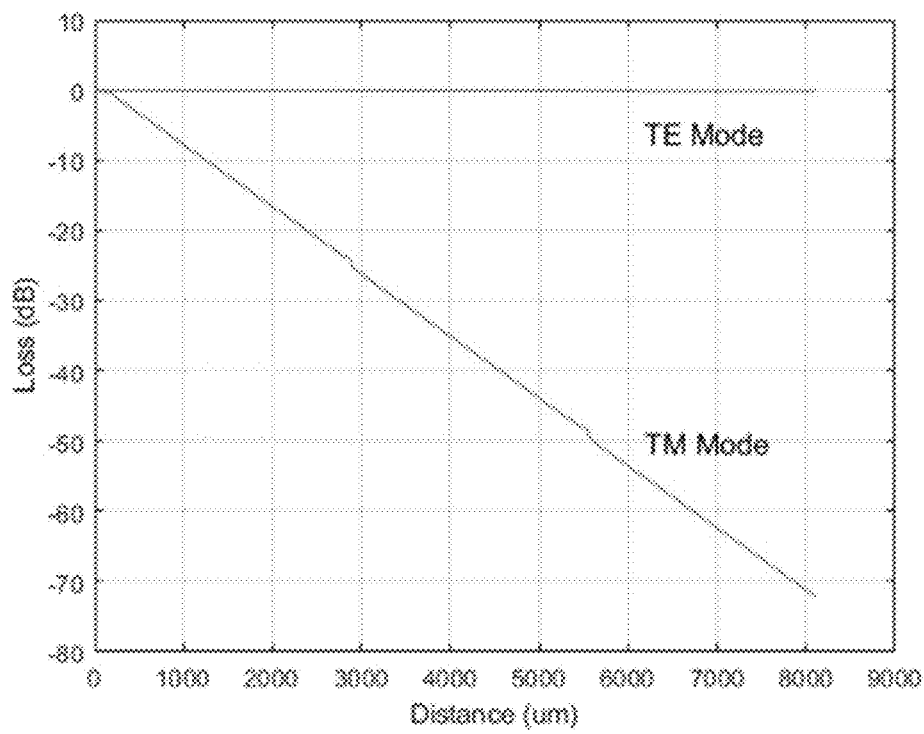
FIGS. 2A and 2B illustrate TE mode performance compared to TM mode performance of the polarizer according to an embodiment of the invention.

The polarizer 118 of the example embodiment comprises an ultrathin Si$_3$N$_4$ waveguide that is loosely confined and has a group birefringence of 0.015 at 830 nm wavelength. One and half periods of s-bend, which forms a m-shape bend, are incorporated between the two Y-junctions 114, 116. As shown in FIG. 2A, the example embodiment of the m-bend polarizer 118 may exhibit a 0.15 dB loss in TE mode, and a 71.9 dB loss in TM mode, at 830 nm wavelength after a propagation distance of 8.1 mm along m-bend waveguide.

Figure 2B:
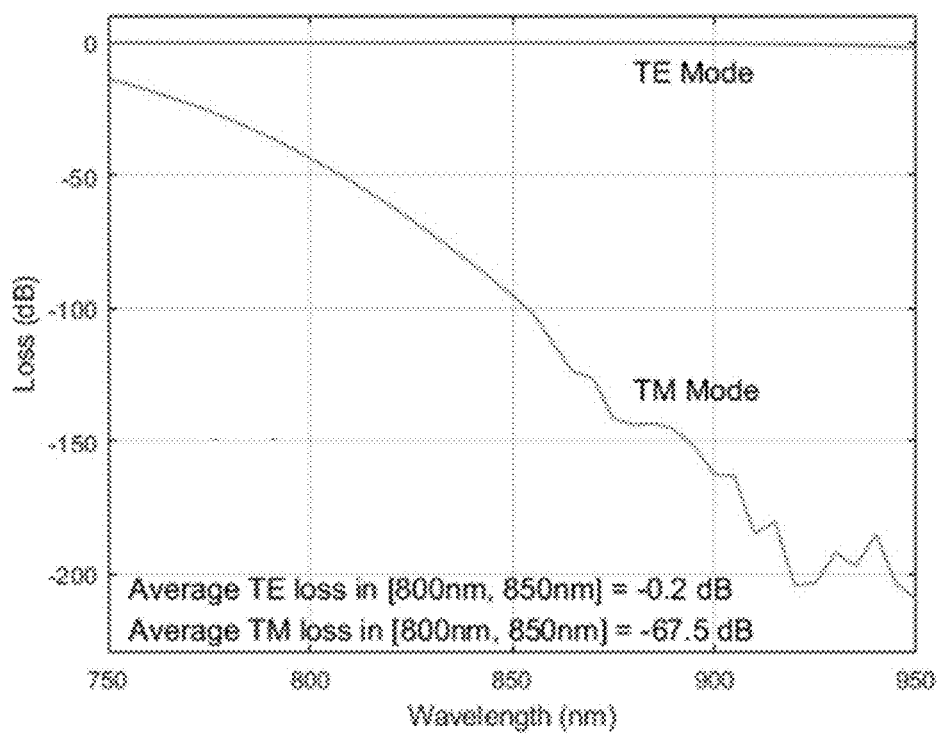

FIG. 2B depicts wavelength-dependent loss of TE and TM modes of the example embodiment "m" bend polarizer 118. The average loss of TM mode in the wavelength window between 800 nm and 850 nm is 67.5 dB, while the average loss of TE mode in wavelength window is only 0.2 dB. As shown in FIG. 1, the parallel arrangement of the two Y-junctions, with spacing of the m-bend polarizer length, effectively prevents the rest of PIC from recoupling of the unguided light of the antisymmetric mode radiated from the interferometric Y-junction.

Figure 3A:
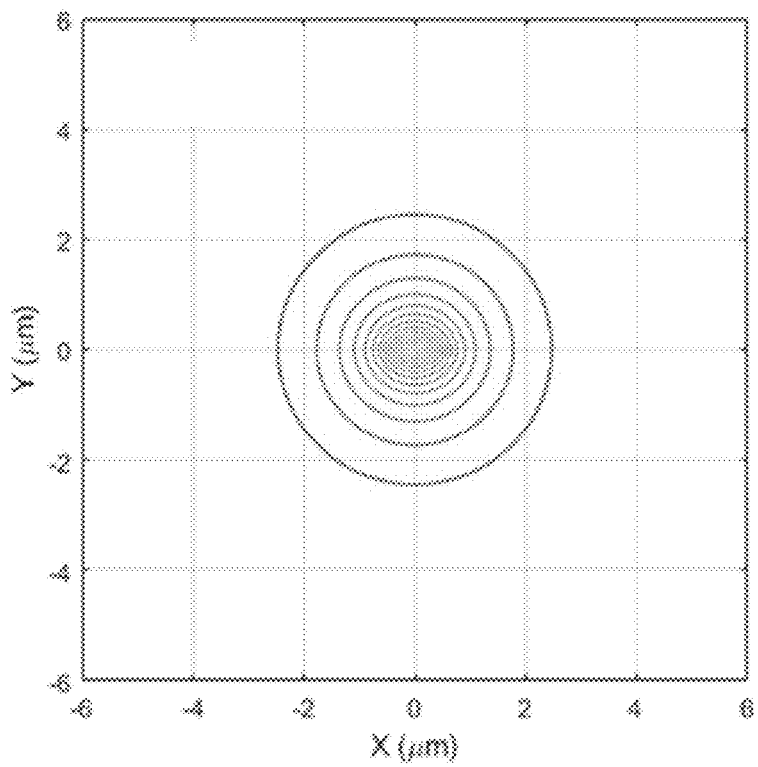
FIGS. 3A, 3B, and 3C illustrate mode size of a fiber connecting point as compared to mode size of a PIC waveguide, and mode size of a PM fiber.
Figure 3B:
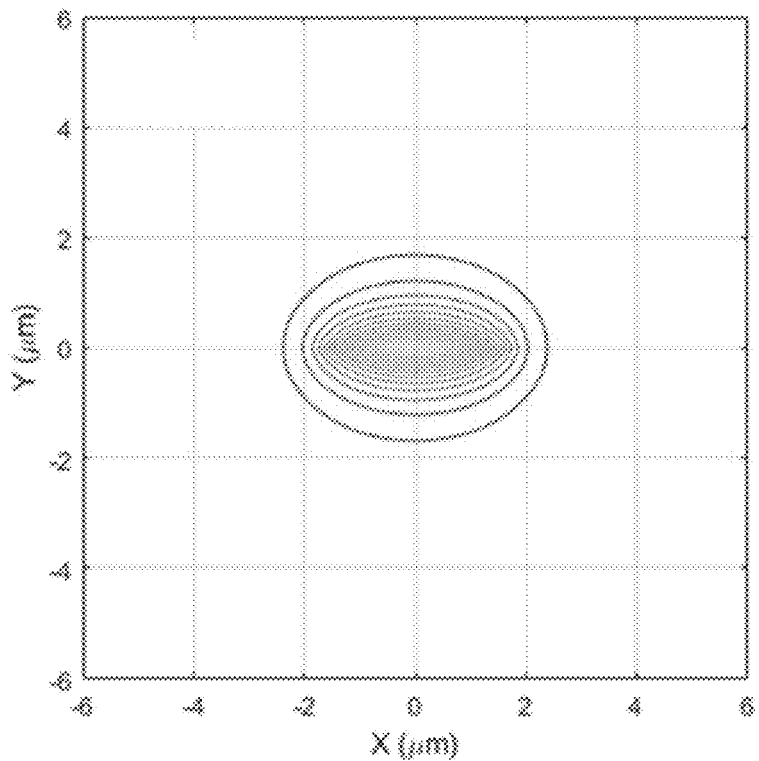
Figure 3C:
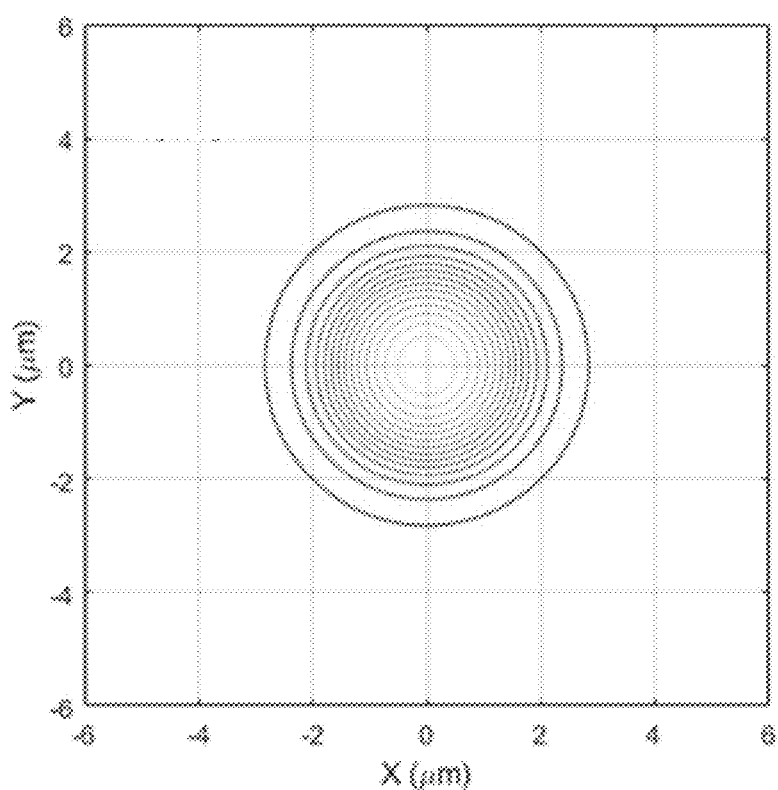

Each individual output port of the PIC is arranged in a fiber array 104 to connect to the corresponding external component fibers. In the example embodiment, the fibers are panda type PM fiber that has mode field diameter of 4.5±0.5 µm. The fibers are aligned in a v-groove substrate with the same pitch with the waveguide array on PIC. Each fiber is aligned with its slow axis coinciding with PIC TE mode direction. Though the PIC waveguide is loosely confined, the mode field size is still smaller than that of the fiber. The example embodiments utilize an in-plane inversed taper to expand the mode field adiabatically to an optimized size that facilitates a substantial match to that of the fiber. The mode field at the fiber connecting point is squeezed to a more circular distribution and of a larger mode size (as shown in FIG. 3A) than that of the base PIC waveguide (as shown in FIG. 3B). The degree of the mode overlapping between the mode field of waveguide at the junction and the fiber mode field is η=0.92 (see FIG. 3C). On the other hand, the coupling coefficient is η=0.81 if the fiber is directly connected with a base PIC waveguide, which has an elliptical mode distribution (see FIG. 3B).

The example embodiments implement an in-plane tapered converter because such a simple structure keeps fabrication cost low, and the coupling efficiency may be as high as 0.48 dB at the operation wavelength of 850±50 nm.

Figure 4:
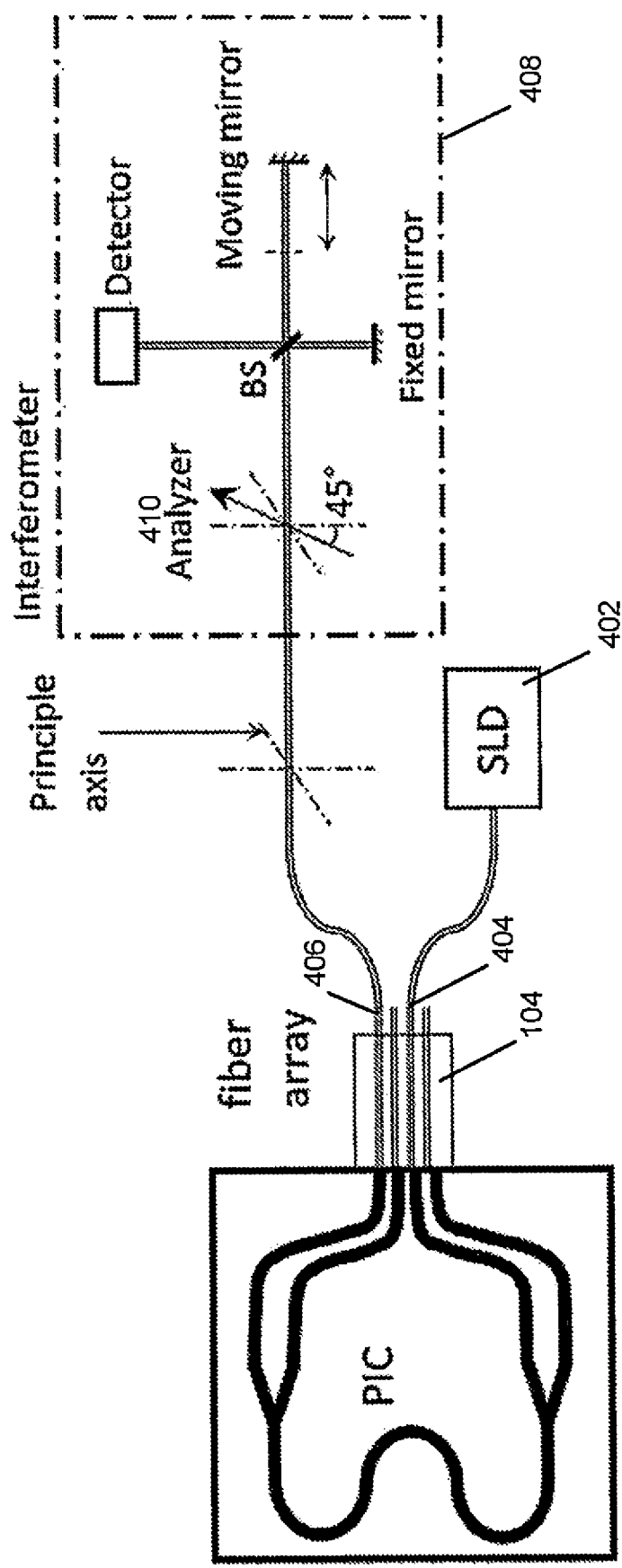
FIG. 4 depicts the setup for measurements of PIC waveguide birefringence and the PER of the polarizer, according to an embodiment of the invention.

FIG. 4 depicts the setup for measurements of PIC waveguide birefringence and the PER of the polarizer 116. Waveguide birefringence is measured using a white light interferometer (WLI), or optical coherence domain polarimetry (OCDP).

A WLI utilizes an incoherent light as the source of a Michelson interferometer, of which the two arms are corresponding to the two polarization paths, respectively, of the PM optical system under investigation. A moving mirror changes the relative path difference between the two polarization modes. Since the source has a very short coherence length, an interference peak appears at a location where a cross-polarization coupling happens when the moving mirror scans along equivalently the optical path of the fixed arm. The strength and the position of the cross-coupling point are measured which reveal the cross-polarization coupling, component extinction and waveguide birefringence information of the system. The measurement is accurate and practical since the same light source, which is a pigtailed superluminescent diode (SLD), is used for both the WLI measurement and the IFOG light source 110. The group birefringence and the PER measured with this method perfectly reflect the roles of the components play in the corresponding IFOG.

Figure 5:
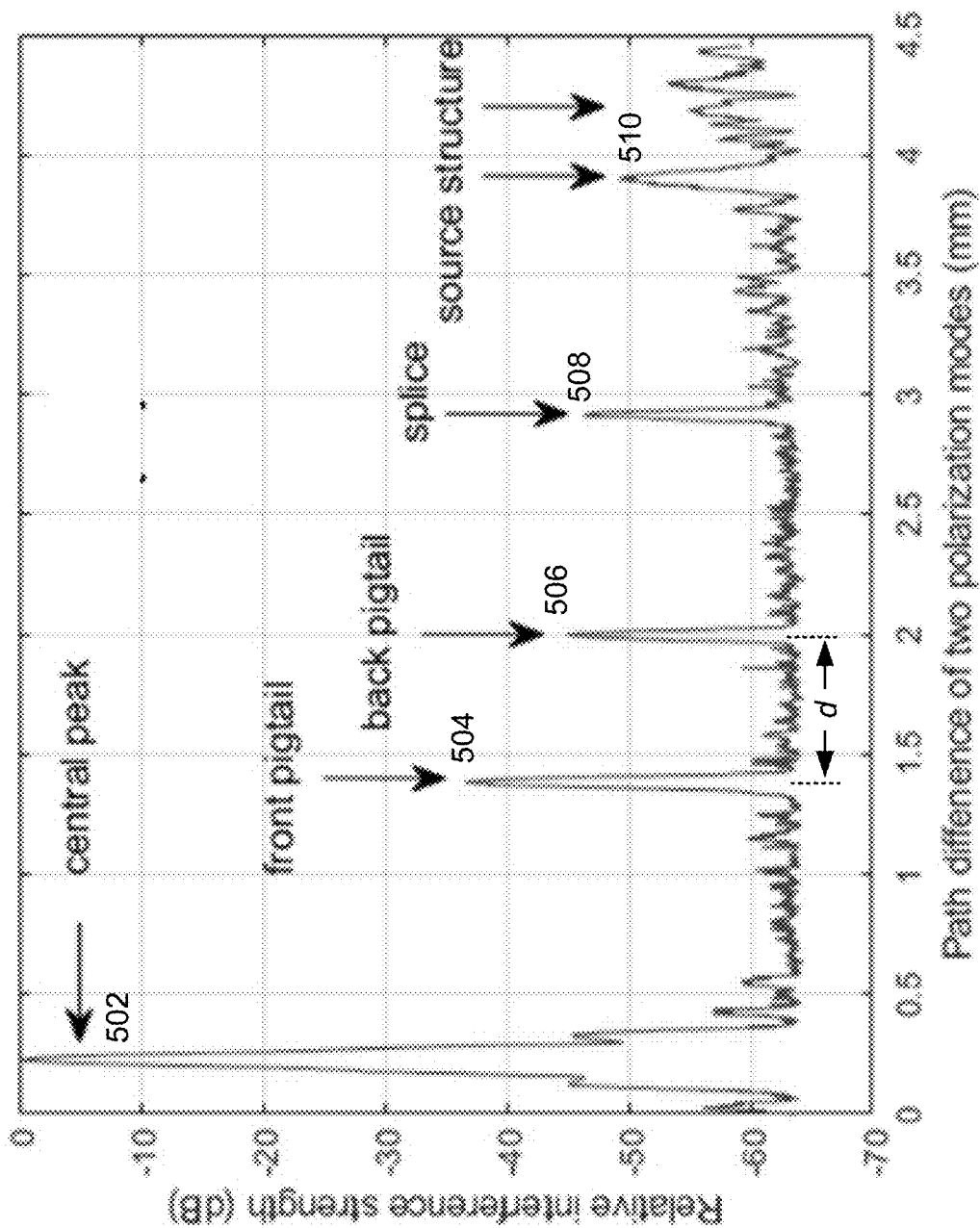
FIG. 5 shows white light interferometer data depicting cross-coupling locations in the PIC, at PIC-to-fiber and fiber-to-fiber joints, according to an embodiment of the invention.

As depicted in FIG. 4, a pigtailed SLD 402 is spliced to the source port fiber 404 of the fiber array 104. The output is the fiber 406 connected to one of the fiber coil ports, which serves as the input of the WLI 408. The measured WLI data indicates five major cross-coupling locations, as shown in FIG. 5. The cross-coupling location 502 close to zero is the position of the 45° polarization analyzer 410 of the WLI. The second cross-coupling location 504 is produced by a cross-polarization coupling at the fiber connection to one of the coil ports. The third cross-coupling location 506 is induced by the cross-coupling at the connecting point of the source fiber. The fourth cross-coupling location 508 comes from a splice between the fiber connecting to the PIC and the fiber pigtailed to the SLD source. The fifth cross-coupling location 510 is the transmitted light of the SLD source through the optical system. The distance d between the second peak 504 and the third peak 506 is the optical path difference between the TE mode and the TM mode of PIC waveguide. The waveguide birefringence can be found by the ratio of the distance d between the two peaks to the length of the waveguide. In the example embodiment, the waveguide group birefringence is 0.015, which manifests a short 1.8 mm depolarization length of a polarized light in the waveguide, and a 28 µm decoherence length i.

Figure 6:
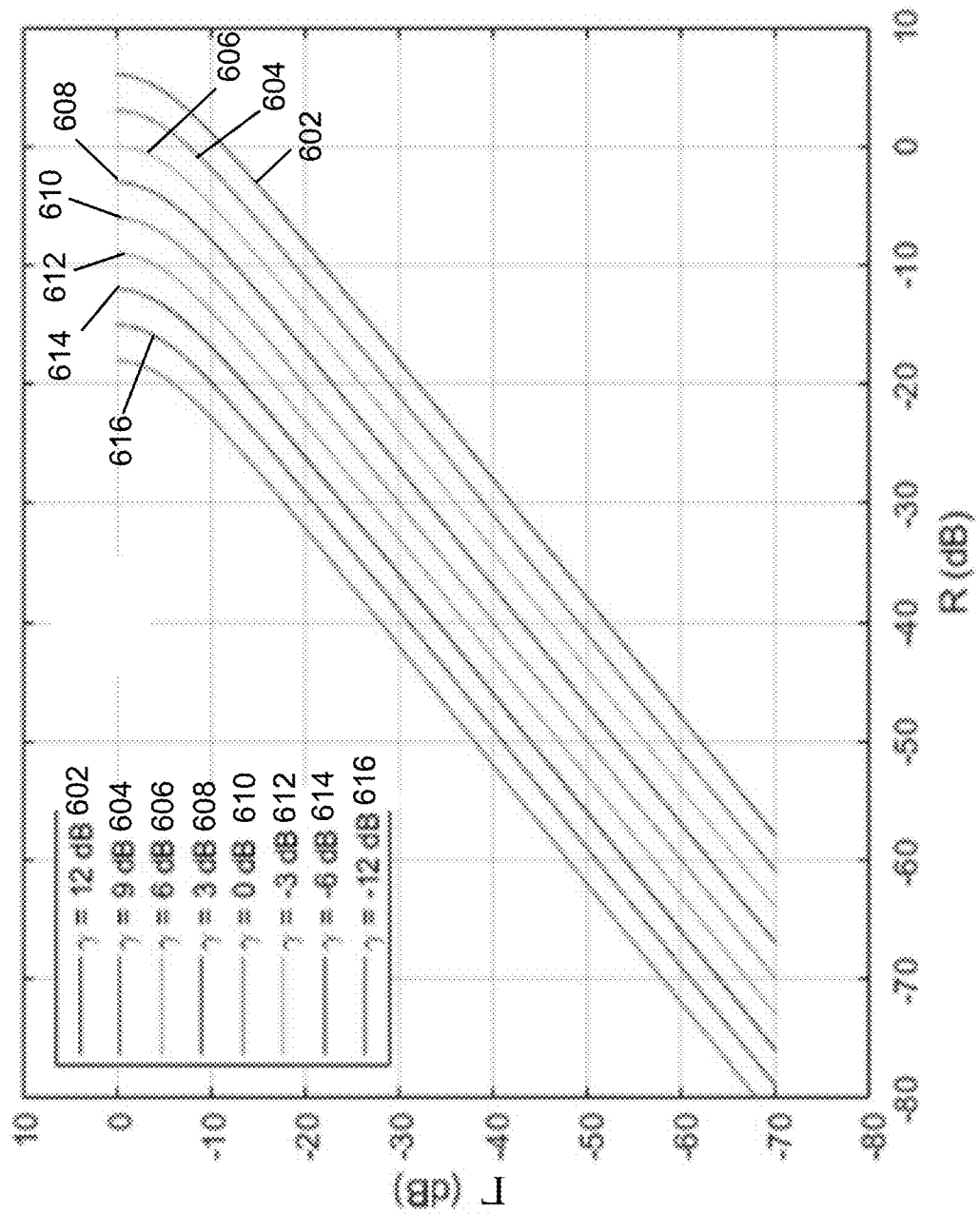
FIG. 6 shows the relationship between the PER of the polarizer and interference strength between the TE and TM modes, for different power ratios between the two modes.

We measured the PER from the source port to the coil port using two different methods, the rotation analyzer method and WLI method. Although we measured the PER of the half of the PIC so the circuit involving additional two Y-junctions, the majority of the polarizing effect comes from the m-shape polarizer, since the straight waveguide and the two Y-junctions support low-loss propagation in both TE and TM modes, and the polarization cross-coupling is <60 dB. In a WLI measurement, the light from the SLD source launches light in both TE mode and TM mode into the PIC circuit, in which the TE mode and TM mode subject to a difference attenuation after transmitted through the circuit. The normalized WLI signal, which is the interference strength between the fast wave and the slow wave when the moving mirror is at the position where the two waves are overlapped, is $$R = \frac{\sqrt{r}}{(1+r)},$$

where $$\left(\frac{E_f}{E_s}\right)^2 = \gamma \cdot \Gamma,$$

and $E_f$ represents the electric field of fast (TM) mode of the waveguide, $E_s$ represents the electric field of the slow (TE) mode of the waveguide, $\gamma$ represents the power ratio between the two polarization modes of the SLD source, and $\Gamma$ represents the PER of the polarizer. The relationship between $\Gamma$ and R, at different values of $\gamma$, are plotted in FIG. 6. In the setup of the WLI measurements of the example embodiments, the $\gamma$ value of the SLD source 402 is −6.8 dB, the R value of the source is read from the highest peak in the source structure 510 (see FIG. 5) as −49.2 dB, and so the PER of the polarizer ($\Gamma$) is −42.4 dB.

The same port-to-port PER of the PIC may alternatively be measured using a rotation polarization analyzer method. A linear polarized light from the source port was launched with the polarization plane at 45° with respect to the principal polarization axis. The output light from the coil port, collimated using a low-stress and large aperture lens, is passed through the polarization analyzer, which is Thomson-Glen polarizer with 50 dB PER, and received by an optical power meter. The PER is measured by determining the difference between the maximum and minimum power when the analyzer is rotated through 360°. The measured port-to-port PER on the example embodiment PIC is −45.3 dB, which is consistent with the WLI measurement described herein. The 3.1 dB discrepancy of PER with two methods may be explained by a less than perfect alignment at the two fiber-PIC connection.

The propagation loss of the example embodiment PIC waveguide may be determined by measuring its transmission spectrum. The input light may be provided by a wavelength swept laser that had a full width at half maximum (FWHM) of 0.02 nm. The laser may be coupled into a PM fiber and linearly polarized with an in-line fiber polarizer. The light output from a fiber tip may be aligned to launch only TE mode of the waveguide. The fiber tip may be situated at approximately 0.2 mm away from the waveguide facet to avoid local Fabray-Perot effect. The transmitted light may also be proximately coupled to a second PM fiber, of which the output light is received by a power meter. The laser wavelength is scanned from 830 nm to 830.6 nm with a step size of 0.02 nm. An average power at each wavelength step is recorded, and the Fourier transform of the transmission spectrum is compared with the theoretical spectrum. The propagation loss of the example embodiment PIC waveguide is estimated as 0.24 dB/cm. There is no strong variation of the propagation loss in the wavelength range for IFOG operation.

A waveguide Y-junction with broadband 3-dB split ratio (i.e., an equal, 50-50 split of power from the base of the Y-junction to its branches) is a crucial component of the Sagnac interferometer. Keeping a 50-50 split ratio in the operation wavelength range is important regarding the noise reduction and bias and scale factor stability. Phase errors induced by backscattered signal generated in the fiber coil can be eliminated at exact 50-50 coupler ratio. A Y-junction that does not exhibit a 50-50 split ratio in a FOG minimum configuration (i) may generate more antisymmetric mode, radiated out from the interferometric Y-junction, to the direction of base waveguide, (ii) may have more stray light recoupled into the circuit, and (iii) may produce more phase error. A Sagnac interferometer with a Y-junction that does not exhibit a 50-50 split ratio may also have a smaller scale factor as compared to the use of a Y-junction with a 50-50 split ratio. If the split ratio changes with wavelength, an additional scale factor error may be introduced, since the centroid wavelength of a SLD changes with temperature.

The described embodiments of a PIC use a simple symmetric Y-junction due to its compactness, good tolerance to fabrication error, and successes of this type of coupler for FOG application on a $LiNbO_3$ substrate. The example embodiments of the PIC Y-junctions exhibit a split ratio of 0.5±0.0068 in the wavelength range of 816 nm~846 nm. The split ratio, which is very close to 50-50 in the whole gyro operation wavelength range, demonstrates an advantage of using an integrated Y-junction in the IFOG PIC. This precise split ratio contributes to the good temperature stabilities of gyroscope bias and scale factor in these PIC IFOG prototypes.

The theoretical coupling efficiency of the PM fiber to the PIC waveguide, which has an inversed taper to expand the mode field size, is 0.48 dB. The described embodiments routinely achieve 0.9 dB coupling efficiency per connection on a PIC that is pigtailed using the fiber array alignment method described herein. Since the propagation loss is known to be 0.24 dB/cm, the pigtail loss can be readily estimated assuming the two connections have the same coupling efficiency.

The measured mode field of the PIC waveguide at the fiber connecting ends has a size of 4.3 µm (vertical)×4.3 µm (horizontal) to the $1/e^2$ of the peak power. For the mode-field measurement, a linearly polarized light was coupled into the source port of the PIC to excite only the TE mode of the waveguide. The output pattern from one of the coil ports was projected onto the sensing surface of a CCD camera by using a large aperture and low stress lens. The actual size of the mode field was calibrated by using the PM panda fiber, of which the outer diameter was measured using a calibrated microscope. For calibration, the cleaved fiber tip was placed at the same place as the PIC output, and the fiber end image was projected on the surface of the CCD camera using the same optics.

Optical reciprocity must be hold in a fiber Sagnac interferometer to achieve a high performance of an IFOG. The most mature polarization configuration is to control the overall interferometer operating in one linear polarization mode. To this end, every component and connection comprising the interferometer must be polarization maintaining. Any cross-polarization coupling, and other types of non-reciprocal effects add erroneous signal to the Sagnac signal. For example, a parasitic interferometer can be generated due to cross-polarization couplings in the Sagnac interferometer, or due to recoupling of non-guided stray light from adjacent component or connection, or due to back-reflection or back-scattering at the non-smooth waveguide and connections. The high integration of an IFOG PIC presents new challenges to suppress the non-reciprocal effects because of the high density of optical components being arranged in a small area. Each of the components or connections in the circuit may act as a defect point that either couples light in the operation polarization mode into the orthogonal polarization mode or generates non-guided stray light that is readily received by later circuit and neighboring components. In case of cross-polarization coupling, if the cross-coupled light is in the main polarization mode and meets with the main light within a waveguide length shorter than the depolarization length, an erroneous rate signal is added to the true signal due to an interference. To prevent formation of such a parasitic interferometer, the waveguide length between the two cross-coupling points must be longer than depolarization length. In case of stray light recoupling, the difference between the recoupled light path and the main light path must be longer than decoherence length. Fortunately, an integrated waveguide can be designed to have an ultra-large birefringence, so that very short depolarization and decoherence lengths are presented in the PIC waveguide. To make a single mode PM waveguide with high birefringence and low propagation loss at 830 nm wavelength, a $Si_3N_4/SiO_2$ waveguide with large width-to-height ratio (at least 50) provides an ideal platform.

Figure 7A:
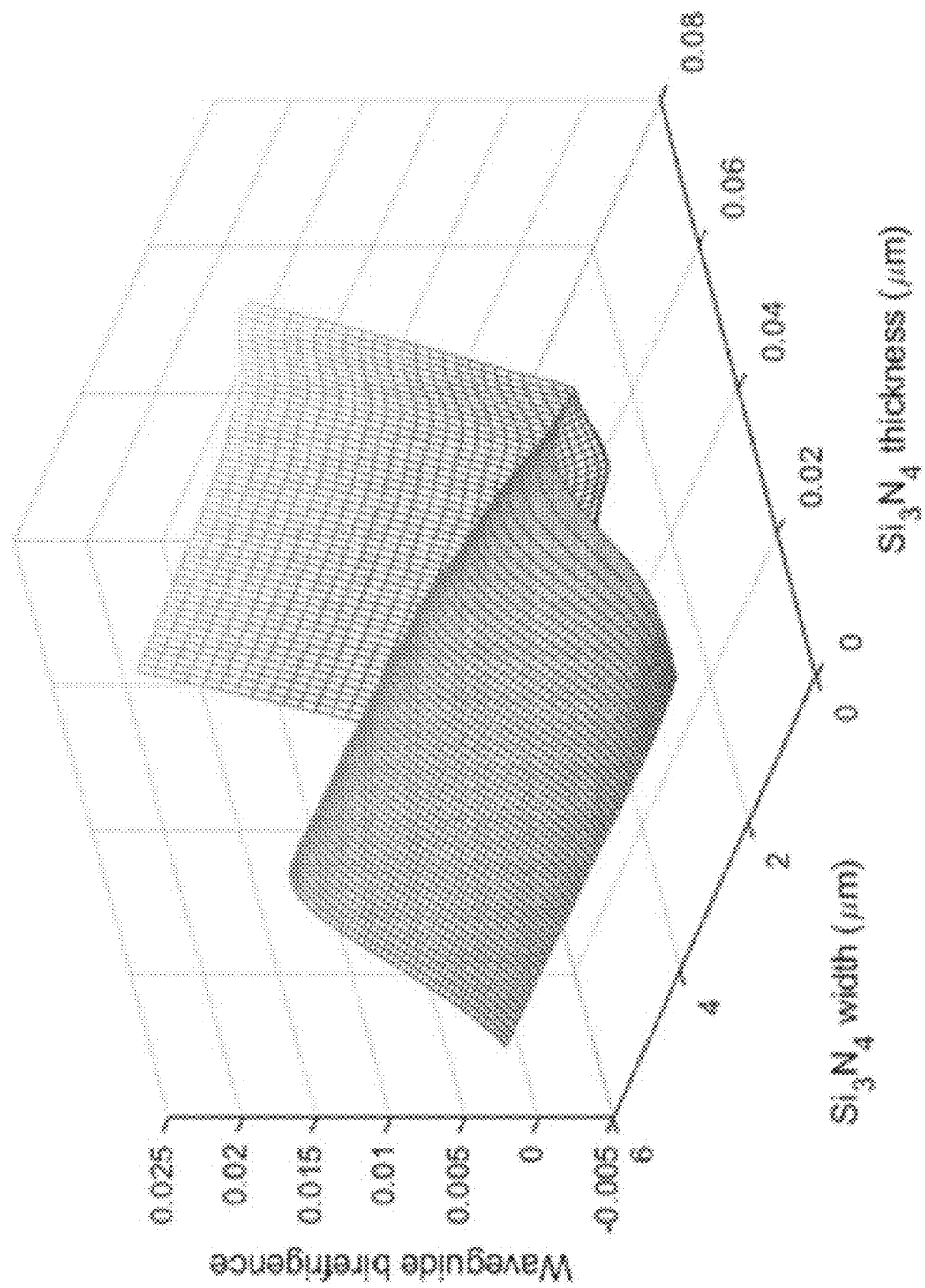
FIG. 7A shows waveguide birefringence as a function of the thickness and width of waveguide core.

To optimize the waveguide core dimensions, the effective indices of TE mode and TM mode are calculated, respectively, as a function of $Si_3N_4$ width and height using a commercial simulation tool. The waveguide birefringence is then calculated as the index difference of the two polarization modes. On the $Si_3N_4$ height-width plane, the waveguide birefringence shows a smooth ridge profile in the $Si_3N_4$ height range between 0.03 and 0.04 µm (see FIG. 7A), though the indices of the two modes increase monotonously with waveguide width and height. In the area of larger waveguide height on the other side of the "valley" (see FIGS. 7A and 7B), the birefringence increases relatively steeply with waveguide height. The width choice of the $Si_3N_4$ core is limited by the threshold where the waveguide starts to support the first higher TE mode. The waveguide width must locate in the single mode region since the propagation loss increases rapidly in the higher order modes, and the property of polarization maintaining will be not hold for a waveguide supporting higher order mode. The magenta solid line is the simulated threshold line. Therefore, the optimal waveguide core dimension is either within the area enclosed by the 0.012 contour line of birefringence and the threshold line of high-order mode, or in the area at the lower right corner of FIG. 7B.

Propagation loss is another waveguide property relevant to a waveguide optimization. In general, the attenuation of an optical guided wave can be ascribed mainly to two mechanisms for a non-leaking straight waveguide: surface scattering and bulk absorption. Since the LPCVD $Si_3N_4$ core material and the $SiO_2$ cladding material has a very low material loss and a broad transparency wavelength window (e.g., 0.4-6.7 µm), the predominant mechanism for the waveguide loss is radiation loss arising from scattering by surface roughness of the waveguide walls between $Si_3N_4$ core and $SiO_2$ cladding. The estimation of scattering loss due to sidewalls roughness has been developed such that the three-dimensional (3D) guiding structure is taken into account. A salient result is that the top and bottom interfaces contribute approximately 3 to 4 orders of magnitude higher scattering loss than the contribution from the side walls when the height of a $Si_3N_4$ core is between about 20~100 nm.

The following expression may be used for the coefficient of radiation loss produced by surface roughness scattering in a symmetric single-mode waveguide.

$$\alpha = \varphi_s^2(n_1^2 - n_2^2)^2 \frac{k_0^3}{4\pi n_1} S$$

where $$\varphi_s^2 = \frac{E_s^2}{\int_{-\infty}^{\infty} E_s^2 dy}$$

is the normalized electric field intensity at the core/cladding interface, $n_1$ and $n_2$ are refractive indices of the core and cladding materials, $k_0$ is the free-space wavenumber, $$S = \sqrt{2}\pi\sigma^2 L_c \frac{\sqrt{\gamma_1 + \gamma_2}}{\gamma_2}$$

is the exponential autocorrelation function, where $\sigma^2$ is the mean square deviation and $L_c$ is the correlation length of the bottom interface and top interface roughness, and $$\gamma_1 = 1 - L_c^2(\beta^2 - n_2^2 k_0^2)$$

$$\gamma_2 = \sqrt[4]{4L_c^2\beta^2 + [1 - L_c^2(\beta^2 - n_2^2 k_0^2)]^2}$$

where $\beta$ is the modal propagation constant. In our simulation, a symmetrical waveguide is assumed, which means the contribution from the top and bottom interfaces are the same, and $\sigma = 0.8$ nm and $L_c = 80$ nm. The $\varphi_s^2$ values at different core height and width may be determined using a commercial waveguide simulation tool, which utilizes a beam propagation method to determine the waveguide mode field. It can be shown that the propagation loss increases monotonically with both the core height and width in the desired core dimension range. For instance, the loss increases from 0.031 dB/cm to 0.524 dB/cm when the core height increases from 10 nm to 60 nm at fixed width of 3.7 µm (see FIG. 8A).

A important measure to have an accuracy and sensitivity FOG is to minimize the cross-polarization coupling in the Sagnac interferometer. This becomes more important in the PIC FOG since the integrated waveguide can be subject to more material stress and more optical scattering, and the distances between functional components are closer. Making waveguide of the FOG PIC "highly" polarization maintaining is crucial to mitigate the cross-polarization coupling. In order to fabricate a waveguide highly polarization maintaining, the waveguide needs to be designed to be of ultra-high birefringent and ultra-low scattering. Those make the waveguide less chance to have an operational polarized light coupled into the orthogonal polarization state due to stress in the waveguide materials (high birefringent) and due to optical scattering at the waveguide interfaces (low scattering). The parameter for an evaluation of the capability to hold a polarization state is H-parameter, or holding parameter, which is defined as $$H = \frac{P_x}{P_o \times L}$$

where $P_o$ is optical power in operational polarization state, $P_x$, is accumulated total optical power cross-coupled into the orthogonal polarization state in the section of the waveguide, and L is the length of the waveguide section. In the measured WLI data in FIG. 5, the noise floor between the front pigtailing (504) and back pigtailing point (506) is mainly less than −63 dB, and accumulated total $P_x/P_o$, is less than −60 dB. The waveguide length between the two pigtailing points is 3.3 cm. Therefore, the H-parameter of the waveguide in the example embodiment is H~−45 dB/m.

Figure 8B:
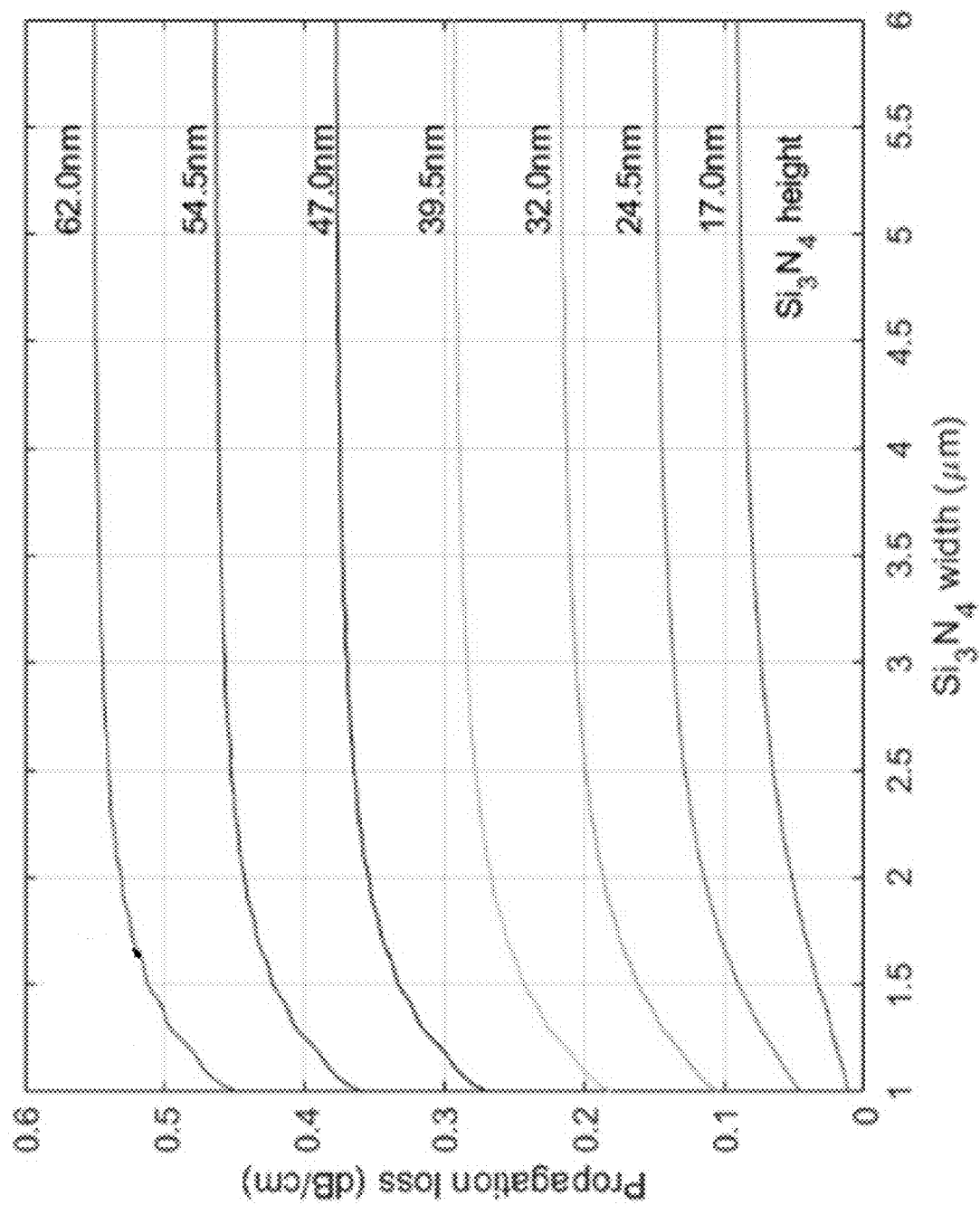
FIG. 8B shows core width dependency of propagation loss at different core heights.
Figures 9A, 9B, 9C, 9D, 9E, 9F:
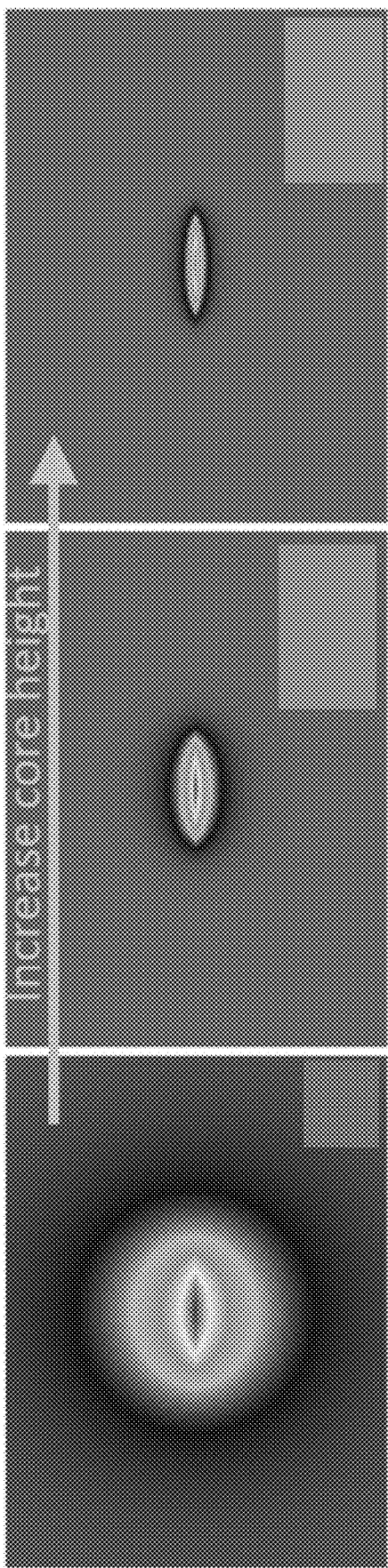
FIGS. 9A through 9C illustrate mode fields as waveguide core height increases.
FIGS. 9D through 9F illustrate mode fields as waveguide core width increases.

FIGS. 9A, 9B and 9C show the simulated mode field at a fixed waveguide width and with the waveguide height increasing from FIG. 9A to 9C. The mode field is drastically squeezed out into the $SiO_2$ cladding at 10 nm core height in both horizontal and vertical directions. This makes normalized electric field strength at the core/cladding interface, $\varphi_s^2$, a very small value, therefore the waveguide has a correspondingly low propagation loss. At a larger core height of 60 nm and at the same width of 3.7 µm, the mode field becomes more concentrated at the $Si_3N_4$ core strip in both horizontal and vertical directions (see FIG. 9C) and results in a larger $\varphi_s^2$ value and a higher loss waveguide. The mode-field change is much slower with waveguide width than that with the height as shown in FIGS. 9D, 9E and 9F. The mode field expends in the horizontal direction approximately linearly with the increase of the core width when core has a fixed height, while the mode height has almost no change. In this process, the $\varphi_s^2$ value increases and almost saturates for greater waveguide widths, so is the propagation as indicated in FIG. 8B.

Figure 7B:
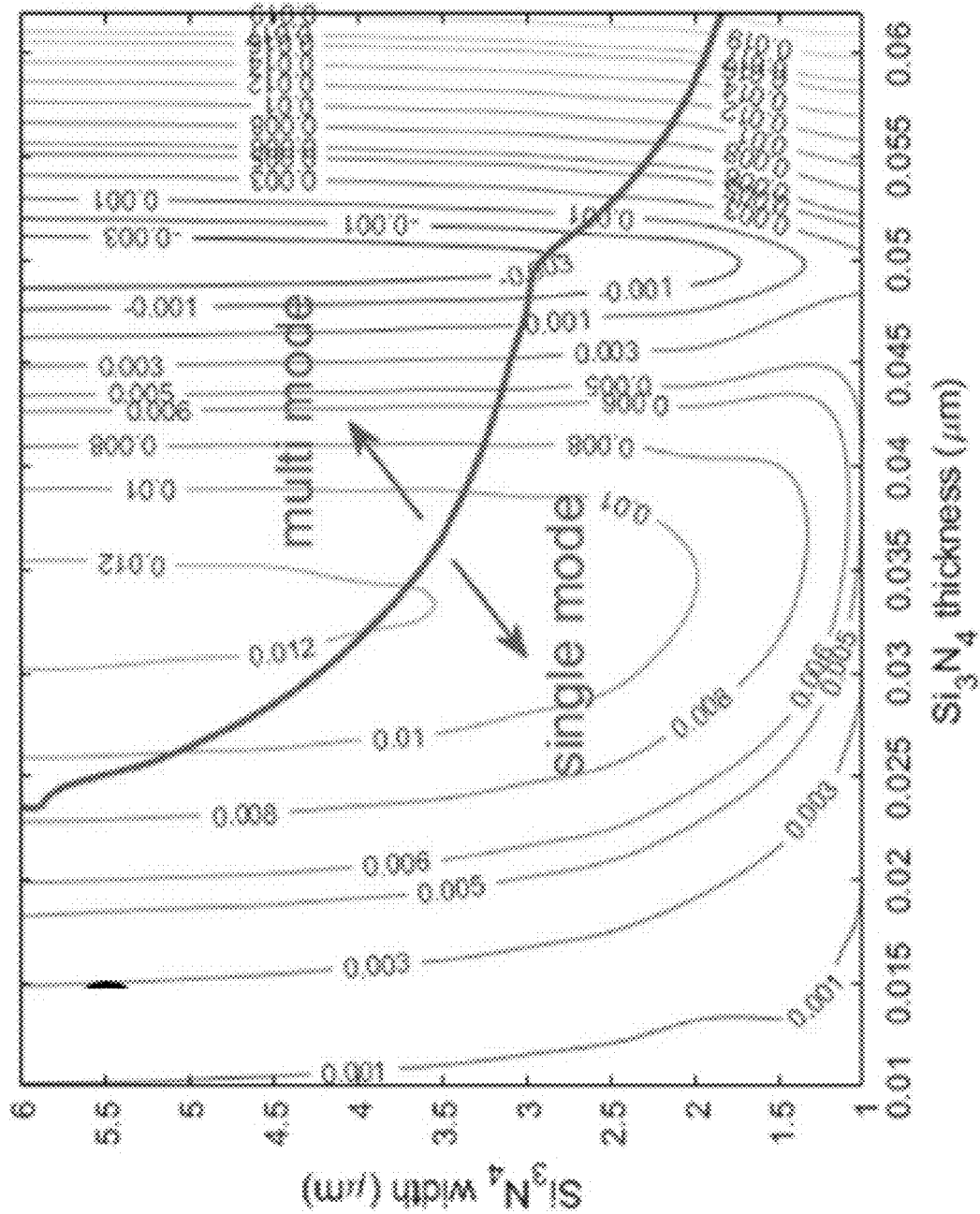
FIG. 7B shows a threshold line where a waveguide starts to support the first higher order of TE mode, overlaid on a waveguide birefringence contour map.
Figure 8A:
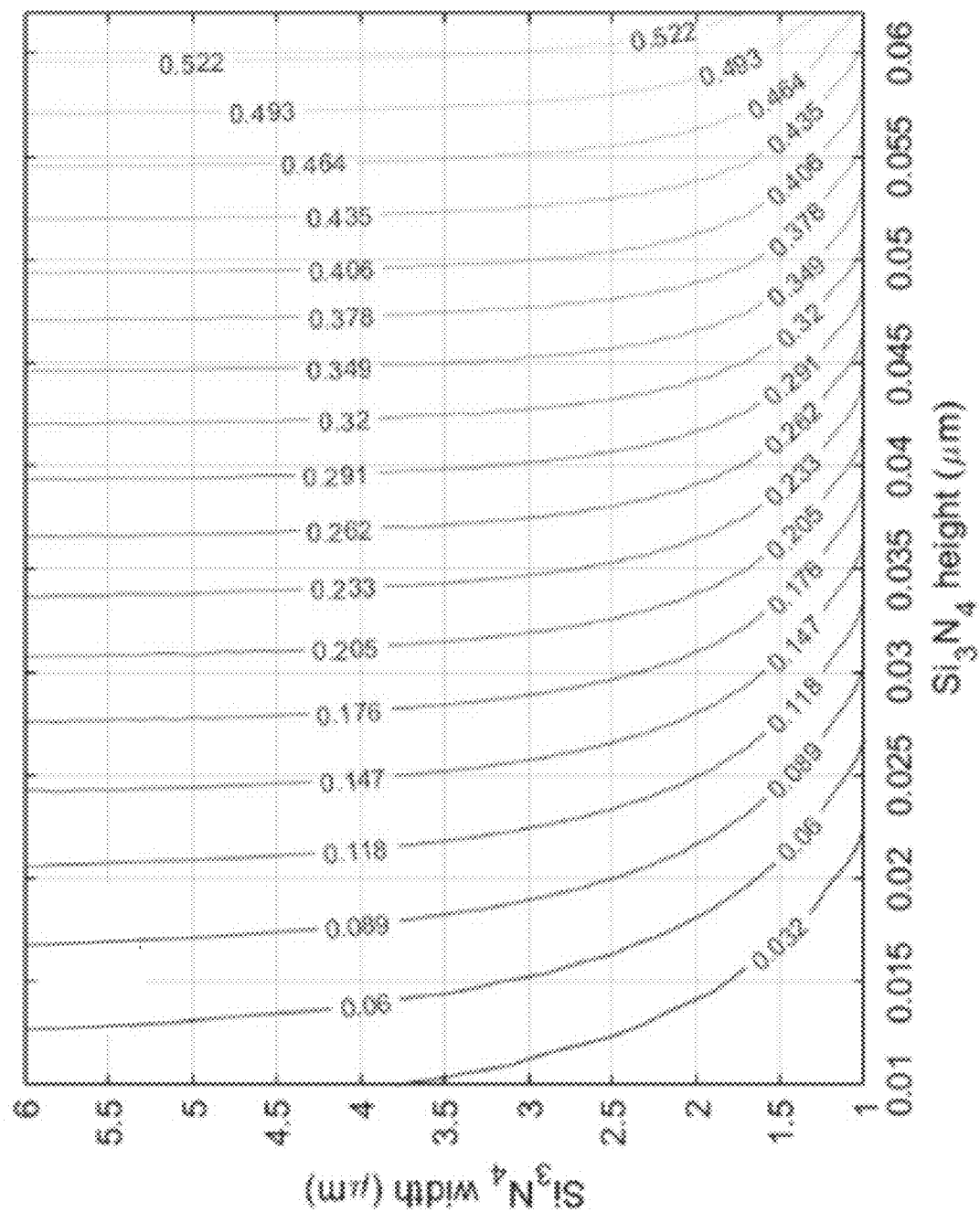
FIG. 8A shows waveguide propagation loss as a function of the thickness and width of a waveguide core.

Given the birefringence contour map shown in FIG. 7B and loss contour map in FIG. 8A, we are able to make a choice for an optimal core dimensions for the waveguide. We want a waveguide to have both a high birefringence and low propagation loss. First consider the waveguide birefringence map in FIG. 7B. In the single mode area, there are two candidate locations: one is on the top of the birefringence ridge at the center of birefringence map, another one is at the edge of the steep birefringence slope at the lower right corner. The birefringence at the two locations is 0.015 and 0.019, respectively. 0.019 is 27% increases from 0.015. On the other hand, referring to the propagation loss of FIG. 8A, the loss at the two corresponding locations are 0.22 and 0.52 dB/cm. The loss is more than doubled (136%) from the 0.22 dB/cm to 0.52 dB/cm loss. Considering further that the birefringence is more stable and tolerable to the fabrication error in the smooth ridge area, and a thinner $Si_3N_4$ core can achieve a mode-field dimension that has a better match to the fiber mode-field of the sensing coil, we choose a waveguide dimensions located on the top of the birefringence ridge.

While example embodiments have been particularly shown and described, it will be understood by those skilled in the art that various changes in form and details may be made therein without departing from the scope of the embodiments encompassed by the appended claims.

What is claimed is:

1. A photonic integrated circuit (PIC) comprising:
   a polarizer comprising a polarizer waveguide and having a first polarizer port and a second polarizer port, the polarizer configured to have, within a range of operational wavelengths of the PIC, a propagation extinction ratio (PER) of at least 75 dB and a birefringence of at least 0.012;
   an interferometric Y-junction having a base waveguide, a first branch waveguide, and a second branch waveguide, that (i) are polarization maintaining (PM), (ii) have an associated depolarization length, and (iii) are configured to support a single transverse mode of light, and the first branch waveguide is longer than the second branch waveguide, the first branch waveguide being longer than the depolarization length;
   a first connector configured to be connected to a light source;

a second connector configured to be connected to a photodetector;

a third connector configured to be connected to a first port of a fiber coil;

a fourth connector configured to be connected to a second port of the fiber coil; and a source Y-junction having a base waveguide, a first branch waveguide, and a second branch waveguide;

wherein the first branch waveguide of the source Y-junction is optically coupled to the first connector, the second branch waveguide of the source Y-junction is optically coupled to the second connector, and the base waveguide of the source Y-junction is optically coupled to the first polarizer port;

wherein the first branch waveguide of the interferometric Y-junction is optically coupled to the third connector, the second branch waveguide of the interferometric Y-junction is optically coupled to the fourth connector, and the base waveguide of the source Y-junction is optically coupled to the second polarizer port; and wherein the base waveguides and the branch waveguides comprise a thin $Si_3N_4$ waveguide with a core thickness that is greater than or equal to 10 nm and less than or equal to 100 nm, and with a core width that is greater than or equal to 1 micron and less than or equal to 10 microns.

2. The photonic integrated circuit of claim 1, wherein an H-parameter of each of the polarizer waveguide, the base waveguide, the first branch waveguide, and the second branch waveguide, is less than −40 dB/m.

3. The photonic integrated circuit of claim 1, wherein a waveguide length difference between the first branch waveguide and the second branch waveguide is greater than a depolarization length of the first branch waveguide and the second branch waveguide.

4. The photonic integrated circuit of claim 1, wherein the polarizer waveguide, the first branch waveguide, and the second branch waveguide each comprises a $Si_3N_4$ core surrounded by $SiO_2$ cladding material.

5. The photonic integrated circuit of claim 4, wherein the core has a width-to-height aspect ratio of at least 50.

6. The photonic integrated circuit of claim 1, wherein the waveguide comprises a plurality of waveguide bends optically connected in series, the plurality of waveguide bends comprising a first 180-degree bend, a second 180-degree bend, and at least one additional bend of at least 90 degrees.

7. The photonic integrated circuit of claim 1, further comprising at least one trench formed along a side of the waveguide, the trench configured to deflect light radiated from the waveguide away from the PIC to prevent stray light from coupling into the PIC.

8. The photonic integrated circuit of claim 1, wherein the base waveguides and the branch waveguides have a birefringence of at least 0.012.

9. The photonic integrated circuit of claim 1, wherein the base waveguides and the branch waveguides have a propagation loss of less than 0.5 dB/cm.

10. The photonic integrated circuit of claim 1, wherein the polarizer waveguide comprises three 180-degree curves, consecutively coupled to one another to form a m shape.

* * * * *